Feb. 7, 1967 R. E. YOUNG 3,303,486

DIGITAL FREQUENCY SHIFT MAGNETIC RECORDING SYSTEM

Filed Nov. 12, 1963 2 Sheets-Sheet 1

RONALD E. YOUNG
INVENTOR.

BY Stuart Lubitz
ATTORNEY

DIGITAL FREQUENCY SHIFT MAGNETIC RECORDING SYSTEM

Filed Nov. 12, 1963 2 Sheets-Sheet 2

RONALD E. YOUNG
INVENTOR.

BY Stuart Lubitz
ATTORNEY

United States Patent Office 3,303,486 Patented Feb. 7, 1967

3,303,486

DIGITAL FREQUENCY SHIFT MAGNETIC RECORDING SYSTEM

Ronald E. Young, Sunnyvale, Calif., assignor to Ampex Corporation, Redwood City, Calif., a corporation of California Filed Nov. 12, 1963, Ser. No. 322,755
6 Claims. (Cl. 340—174.1)

Figure 1:
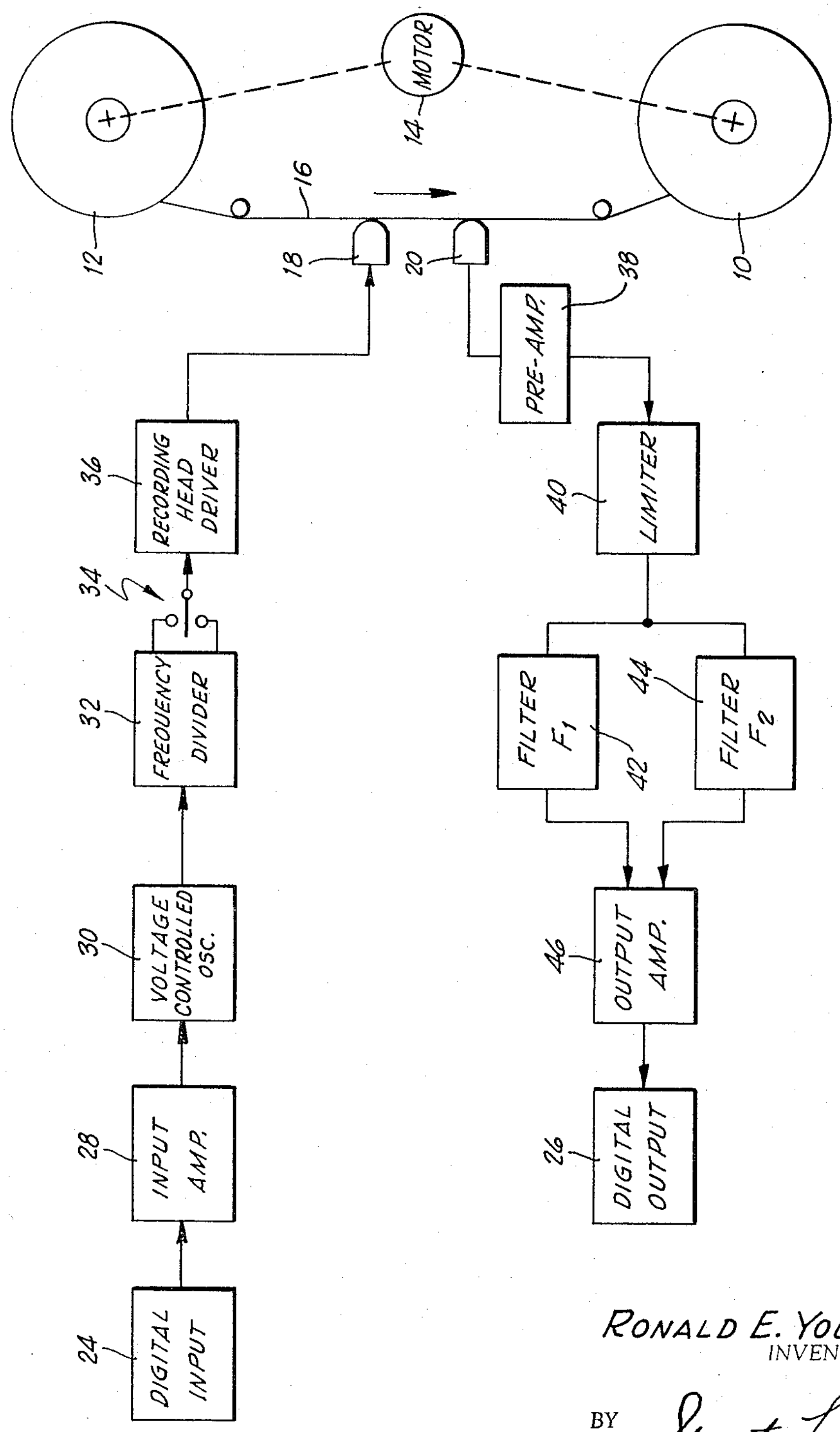

This invention relates generally to magnetic recording and more particularly to a method and apparatus for recording digital data on magnetic tape.

A conventional method utilized for recording digital data on analog type recording equipment is referred to as the NRZ method and is characterized by recording one flux reversal per binary digit (bit) recorded. This method generally suffers from at least several of the following limitations:

(1) If saturation recording is used to achieve the best data reliability, cross talk degrades the performance of the adjacent analog channels.

(2) If sub-saturation recording without bias is used, signal to noise ratio becomes a serious problem.

(3) Since only one flux reversal per bit is recorded, any drop out or marginal head-to-tape contact problem causes a significant number of errors in the reproduced data, necessitating redundant use of two or more tracks for acceptable reliability figures.

(4) The restricted low frequency response of the narrow gap heads commonly used for analog data causes a D.C. shift when these heads are used for digital recording and makes detection at higher bit rates much more difficult.

In view of the limitations of this conventional method of recording digital data on analog equipment, it is an object of the present invention to provide a magnetic recording system utilizing a frequency shift technique which substantially obviates each of the above limitations.

More particularly, each of the following advantages is attributable to the use of the frequency shift recording system disclosed herein:

(1) The recording may be done at sub-saturation levels, with bias, thus producing a high reproduce output level without any substantial cross talk.

(2) Since several cycles per bit may be recorded, the probability of correctly detecting a specific bit is greatly increased.

(3) Since the only two frequencies recorded in the system can be placed at the upper end of the data passband, no significant low frequency problems exist. In fact, it is feasible to use the frequency response band below the digital data to record other information.

(4) The system disclosed herein is less subject to "pulse crowding" than conventional systems.

Briefly, the system involves generating a signal having a first frequency in response to each binary "1" digit and a signal having a second frequency in response to each binary "0" digit. Several cycles of each of the generated frequency signals are applied to a record head for developing magnetic representations of the signals on magnetic tape. In reproduction, the signals read from the tape by a reproducing head are applied to first and second filters which are respectively tuned to the frequency of the recorded first and second frequency signals. A binary device, such as a flip-flop, is operated in response to the output of the filters. In order to properly record the digital data, a frequency divider can be utilized in the record circuit to divide the frequency of the first and second frequency signals by a factor related to the speed of the tape movement.

Figure 2:
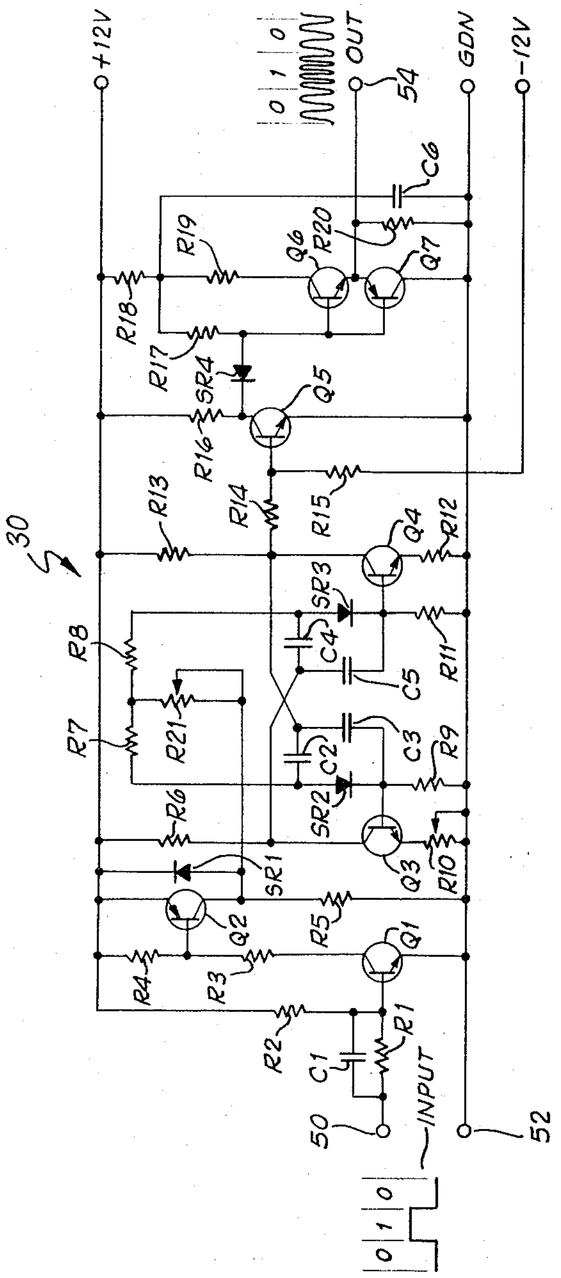

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of apparatus for performing the frequency shift recording technique to be discussed herein; and FIGURE 2 is a schematic diagram of a voltage controlled oscillator which can be utilized in the system of FIGURE 1.

Attention is now called to FIGURE 1 which illustrates a tape transport mechanism including a pair of spools 10 and 12 driven by a motor 14. Wound on the spools is a length of magnetic tape 16 which is moved past a recording head 18 and a reproducing head 20.

As previously pointed out, the function of the system of FIGURE 1 is to record digital data, derived from a digital input source 24 on the tape 16 and to subsequently be able to reproduce that digital data and provide it to a digital output device 26, such as a flip-flop.

Connected to the output of the digital input means 24 which also can comprise a flip-flop, is an input amplifier 28 which functions to amplify and shape the voltage levels representative of data bits received from the input means 24. The output of the input amplifier 28 is coupled to a voltage controlled oscillator which produces either a first $F_1$ or second $F_2$ frequency output signal dependent upon the voltage level of the input signal applied thereto. The output of the oscillator 30 is coupled to the input of a frequency divider circuit 32 which functions to scale down the frequency of the signal provided by the oscillator 30 by an integral factor. Switch means 34 couple the output of the frequency divider circuit to the input of the recording head driver circuit 36. The switching means 34 are utilized to select a particular output terminal of the frequency divider 32 to provide a frequency compatible or matched to the selected tape speed. This switching means 34 may be manually operable or automatically switched with the selection of tape speed. Each frequency divider output terminal corresponds to a different integral divisor factor. The output of the recording head driver 36 is connected to the recording head 18.

The degree of frequency division selected from the frequency divider circuit 32 is matched to the tape speed 16 so that the ratio of tape speed to carrier frequency is constant. Thus, by utilizing a selectable frequency divider circuit, the effective information recorded on the tape can be maintained the same even if the tape movement speed is increased.

The reproduce portion of the system shown in FIGURE 1 functions to retrieve the signal from the tape 16 through the reproducing head 20 which is coupled to the input of a pre-amplifier 38. The output of the pre-amplifier 38 is coupled through a limiter circuit 40 which acts to remove amplitude variations, to the input of a pair of filters 42 and 44. The filters 42 and 44 are respectively tuned to pass the signals having frequencies $F_1$ and $F_2$. As a consequence of utilizing the frequency divider 32 to compensate for increases in speed of the tape movement, the signals appearing at the output of the limiter 40 will necessarily either have a frequency $F_1$ or $F_2$. The outputs of the filters 42 and 44 are coupled through an output amplifier 46 to the previously referred to digital output device 26. Thus, when a signal is passed by filter 42, the output device 26 can be driven to a first state and when a signal is passed by the filter 44 the output device 26 can be driven to a second state.

Attention is now called to FIGURE 2 which illustrates a circuit arrangement which could admirably function as the voltage controlled oscillator 30 of FIGURE 1. The circuit of FIGURE 2 includes an input portion including a parallel circuit comprised of a resistor R1 and a capacitor C1 connected between an input terminal 50 and the base of transistor Q1. The emitter of transistor Q1 is connected to a source of reference potential, nominally shown as ground. The collector of transistor Q1 is connected through a pair of resistors R3 and R4 to a source of positive potential nominally shown as +12 volts. Resistor R2 connects the base of transistor Q1 to the source of positive potential. The base of transistor Q2 is connected to the junction between resistors R3 and R4. The emitter of transistor Q2 is connected to the +12 volt source and the collector is connected through resistor R5 to ground. A Zener diode SR1 is connected across the collector-emitter of transistor Q2.

A pair of transistor Q3 and Q4 are connected in a free-running multivibrator arrangement. The collectors of transistors Q3 and Q4 are respectively connected through resistors R6 and R13 to the source of positive potential. The emitters of transistors Q3 and Q4 are respectively connected to ground via variable resistor R10 and resistor R12 respectively. The bases of transistors Q3 and Q4 are connected through resistors R9 and R11 to ground. The collector of transistor Q4 is connected through a parallel path to the base of transistor Q3. A first branch of the parallel path includes serially connected capacitor C2 and Zener diode SR2 while the second branch includes capacitor C3. A similar parallel path couples the collector of transistor Q3 to the base of transistor Q4. Capacitor C4 and Zener diode SR3 are connected in series, in parallel with capacitor C5.

The junction between capacitor C2 and Zener diode SR2 is connected through resistor R7 and variable resistor R21 to the collector of previously mentioned transistor Q2. The junction between capacitor C4 and Zener diode SR3 is connected through resistors R8 and R21 to the collector of transistor Q2. Both the resistors R10 and R21 are variable so as to enable the frequency of the multivibrator to be somewhat varied.

In operation the binary voltage level signal representing an input binary digit is derived from input amplifier 28 and applied across input terminals 50 and 52. Terminal 52 is connected directly to ground. Let it be assumed, as illustrated, that a "1" bit is represented by an input signal having a voltage level of 0 volt and that a "0" bit is represented by a signal having a voltage level of approximately −2 volts. As long as the terminal 50 is not driven negative, the transistor Q1 is saturated so that the junction between resistors R3 and R4 is at a relatively low potential causing transistor Q2 to also conduct. When transistor Q2 conducts a potential of approximately 12 volts appears at its collector and is applied through resistors R7, R8 and R21 to the capacitors C2 and C4.

When a negative voltage appears at the input terminal 50, the transistor Q1 stops conducting, thereby biasing transistor Q2 to cut off. Zener diode SR1 is then forced to conduct thereby establishing the potential at the collector of transistor Q2 at a point substantially below +12 volts. Since the voltage across resistor R5 determines the voltage to which capacitors C2 and C4 can charge, the potential appearing at the collector of transistor Q2 determines the frequency at which the free-running multivibrator comprised of transistors Q3 and Q4 operates. With Zener diode SR1 conducting, the frequency of the multivibrator is relatively low, e.g. 800 kilocycles. This frequency can be somewhat varied by adjusting variable resistor R10.

An 800 kilocycle output signal can be derived from the collector of transistor Q4 which is coupled through resistor R14 to the base of transistor Q5. The emitter of transistor Q5 is connected to ground and the collector thereof is connected through resistor R16 to the source of positive potential. The base of transistor Q5 is connected through resistor R15 to a source of negative potential. The collector of transistor Q5 is connected through a Zener diode SR4 to the bases of both transistors Q6 and Q7 and through resistors R17 and R18 to the source of positive potential. The junction between resistors R17 and R18 is connected through resistor R19 to the collector of transistor Q6. Transistors Q6 and Q7 are respectively NPN and PNP transistors and have their emitters connected together and directly to an output terminal 54. Resistor R20 is connected across the emitter-collector path of transistor Q7 and capacitor C6 is connected from the junction between resistors R17 and R18 to ground.

The 800 kilocycle output signal available at the collector of transistor Q4 is amplified and clipped by transistor Q5 and supplied to the output terminal 54 through the emitter-follower comprised of transistors Q6 and Q7. The 800 kilocycle output signal available at terminal 54 is representative of a "0" bit, as noted.

If the input level is changed from −2 volts to 0 volt or some positive voltage, transistor Q1 returns to saturation which in turn causes transistor Q2 to conduct. Consequently Zener diode SR1 is cut off and the collector of transistor Q2 returns to approximately +12 volts. Since capacitors C2 and C4 now effectively see a higher voltage, their charge curve slope effectively increases, thereby increasing the multivibrator frequency to a relatively high value, e.g. 1.2 megacycels. This frequency can be adjusted by manipulation of variable resistor R21. The 1.2 megacycle signal available at the collector of transistor Q4 is similarly coupled through transistor Q5 and the emitter-follower to the output terminal 54.

Thus, the method of recording signals of different frequencies responsive to different binary digits should now be understood. The technique is effectively a frequency shift technique meaning that the frequency of the signal applied to the record head 18 shifts between 800 kilocycles and 1.2 megacycles in accordance with the presentation of "0" and "1" bits.

The reproduction apparatus coupled to reproducing head 20 is sensitive to the two recorded frequencies to develop voltage level outputs by controlling the output flip-flop 26. In order to enable data bits to be packed closely on the tape 16, it is desirable that the apparatus coupled to the reproducing head 20 be capable of sensing the state of a bit in as few full cycles of the frequency signal as is necessary. More particularly, it is desirable to record no more complete cycles of the 800 kilocycle and 1.2 megacycle signals than are required by the reproducing apparatus for sensing the bit state. Apparatus which is simple and inexpensive and particularly well adapted to be coupled to the reproducing head 20 of FIGURE 1 is disclosed in U.S. patent application Serial No. 313,482, filed on October 3 1963, by Miroslav Swyryd and Rolf Hofstad, entitled "Binary Frequency Modulation Demodulator", now U.S. Patent No. 3,223,929 and assigned to the same assignee as the present application. In that application, the amplitude envelopes of the signals passed by the filters 42 and 44 are developed and applied to the input of a differential amplifier so that transitions from a "0" bit to a "1" bit and vice versa are rapidly interpreted.

From the foregoing, it should now be apparent that an improved method and apparatus for recording digital data on an analog type magnetic tape system has been disclosed herein. Essentially, recording and reproduction is based on generating, recording, and sensing first and second frequency signals corresponding to first and second binary digits.

What is claimed is:

1. A method of recording and reproducing digital data in an analog type tape recording system, said method comprising the steps of:

generating a first and a second voltage level signal representative of a binary "1" and "0" digit respectively;
introducing the first and second voltage level signals to a single voltage controlled oscillator having a first and a second operating state;

generating a first frequency signal by driving the oscillator to the first state in response to each of said binary "1" digits represented by said first voltage level signals introduced thereto;

generating a second frequency signal by driving the oscillator to the second state in response to each of said binary "0" digits represented by said second voltage level signals introduced thereto;

dividing the frequency of the first and second frequency signals by a factor related to the tape speed;

recording at least one cycle of either said first or second divided frequency signals for each of said binary digits respectively at such time as either the first or the second voltage level signals are introduced to the oscillator; and sensing and filtering said first and second recorded signals to respectively develop first and second output signals in response thereto.

2. A method of recording digital data on and reproducing data from an analog type magnetic tape recording system, wherein the tape can be moved at a plurality of different speeds, said method comprising the steps of:

generating a first and a second voltage level signal representative of a binary "1" and "0" digit respectively;

introducing the first and second voltage level signals to a single voltage controlled oscillator having a first and a second operative state;

generating a first frequency signal by driving the oscillator to the first state in response to each of said binary "1" digits represented by said first voltage level signals introduced thereto;

generating a second frequency signal by driving the oscillator to the second state in response to each of said binary "0" digits represented by said second voltage level signals introduced thereto;

moving said tape past said recording head at a predetermined speed to record magnetic representations of said first and second frequency signals thereon;

dividing the frequency of said first and second frequency signals by a factor related to said tape speed;

applying said generated and divided first and second frequency signals to a recording head; and sensing and filtering said first and second frequency recorded signals to respectively develop first and second output signals in response thereto.

3. In combination with a magnetic tape apparatus including recording and reproducing heads and a transport mechanism for moving said tape at a plurality of different speeds past said heads, means for recording digital data, said means comprising:

digital input means for generating a first and a second voltage level signal representative of a binary "1" and a "0" digit respectively;

a single voltage controlled oscillator coupled to the digital input means and responsive to said first voltage level signal for providing a first frequency output signal and responsive to said second voltage level signal for providing a second frequency output signal; and means including a frequency divider coupled between said oscillator and said recording head for applying inputs to the head representative of at least one cycle of said output signals provided by said single voltage controlled oscillator to said recording head for each of said successively defined binary digits wherein the output of said oscillator is applied to the input of the frequency divider and the output of the frequency divider is operatively coupled to the input of the recording head, said frequency divider output having a frequency dependent upon the tape speed.

4. The combination of claim 3 further comprising switch means coupled to the frequency divider output and adapted to select an output terminal thereof and thus the selected fraction commensurate with the tape speed.

5. The combination of claim 4 wherein first and second filters respectively tuned to pass said first and second frequency output signals are coupled to said reproduction head; and a binary device is coupled to and responsive to signals passed by said filters.

6. The combination of claim 5 wherein a limiter is connected between said reproduction head and said filters.

References Cited by the Examiner

UNITED STATES PATENTS

| | | | |
|---|---|---|---|
| 2,247,905 | 7/1941 | Bryce | 346—72 |
| 2,963,555 | 12/1960 | Brubaker | 340—174.1 X |
| 3,193,781 | 7/1965 | Martner | 331—179 X |

BERNARD KONICK, *Primary Examiner.*

IRVING L. SRAGOW, *Examiner.*

A. I. NEUSTADT, *Assistant Examiner.*